Mar. 20, 1923.
R. C. BLAKESLEE
TELEGRAPH REPEATER
Filed Dec. 20, 1920
1,448,824
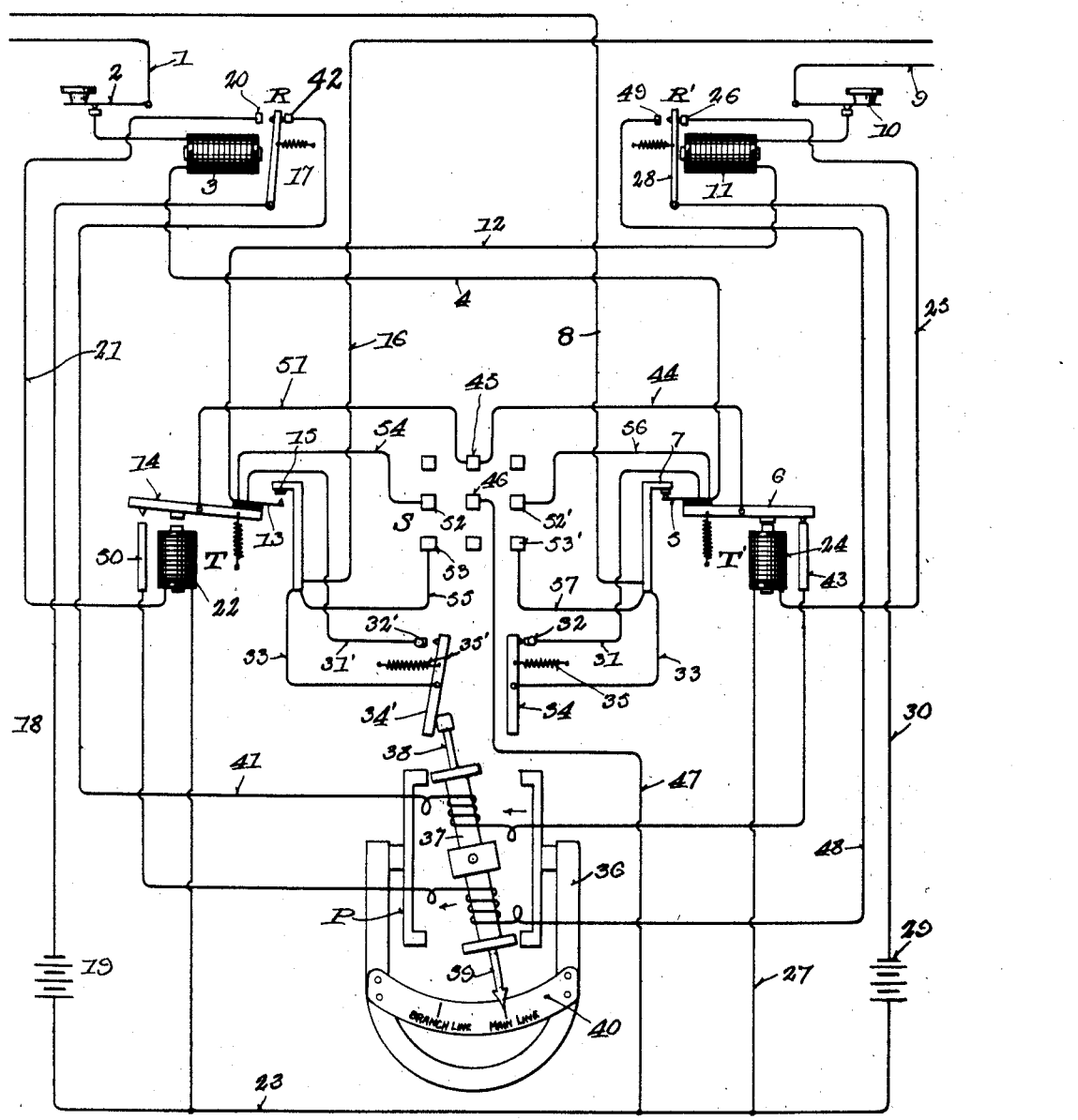
INVENTOR.
R. C. Blakeslee
BY
Edwin B. Hunt
ATTORNEY.

Patented Mar. 20, 1923.

1,448,824

UNITED STATES PATENT OFFICE.

RAYMOND C. BLAKESLEE, OF MILWAUKEE, WISCONSIN.

TELEGRAPH REPEATER.

Application filed December 20, 1920. Serial No. 432,007.

*To all whom it may concern:*

Be it known, that I, RAYMOND C. BLAKESLEE, a citizen of the United States, and resident of Milwaukee, in the county of Milwaukee and State of Wisconsin, have invented certain new and useful Improvements in Telegraph Repeaters; and I do hereby declare that the following is a full, clear, and exact description thereof.

My invention relates to new and useful improvements in telegraph systems and has particular reference to repeaters for use in such systems.

Heretofore in actual telegraph practice it has been generally the custom in repeaters to employ a holding or locking circuit to maintain a closed circuit for the sending line through the contact points on the opposite transmitter or in other words the transmitter not in use. One particular disadvantage of such a repeater is the "kick" which is noticeable during transmission of signals as the holding or locking circuit is opened and closed at each break or make of the sending circuit. The rapid and excessive consumption of battery current is also a disadvantageous feature of present day repeaters. On the other hand other types of repeaters which are very successful under certain atmospheric conditions are practically worthless under other conditions, for instance where there is leakage in the line.

It is therefore the primary object of this invention to provide a repeater which will operate effectively under all climatic conditions without holding or locking circuits and with a minimum consumption of battery current, such current being supplied only by the local circuits. Consequently the difference in potential in the different parts of the main line or the branch line will in no wise affect operation of the repeater.

An additional object of the invention is to provide a repeater for a telegraph system in which both of the line circuits, that is to say the main line and branch line, or as they are sometimes known, the east and west lines, are normally continuous so that in order for one line to repeat into the other it is necessary to break the continuity of the sending line.

Still another object of the invention is to provide a telegraph repeater whose line circuits are normally closed, with a polar relay for breaking the receiving circuit to permit the sending circuit to repeat thereinto.

An additional object of the invention is to provide a telegraph system having a repeater for controlling the sending and receiving line circuits, which repeater includes a polar relay operable by the opening and closing of the respective main and branch line relays.

With these general objects in view the invention resides in the novel features of construction, combination and arrangement of parts which will be hereinafter more particularly described and claimed, and shown in the accompanying drawing wherein The diagram represents a telegraph system provided with my improved repeater, in which instruments are shown with main line breaking, polar relay operated, but branch relay not yet opened.

Referring more particularly to the drawing, it will be seen that the system includes a main line circuit and a branch line circuit which are sometimes known as a West line and an East line respectively. The wire of one side of the main line is designated by the numeral 1 and is connected with a telegraph key 2, the same in turn being joined with the coil 3 of a main line relay R. A wire 4 runs from this coil 3 to the contact point 5 on the armature 6 of a branch line transmitter T', the other contact 7 thereof being connected with the other side of the main line as at 8. The branch line circuit is essentially a duplication of the main line circuit, one side 9 of said branch line circuit being connected with a branch line key 10 through which current flows to a coil 11 of a branch line relay R'. A wire 12 runs from this relay coil 11 to a contact point 13 on the armature 14 of a main line transmitter T. The other contact point 15 of this transmitter T has a branch line circuit wire 16 connected therewith in the same manner as the wire 8 is attached to the contact point 7.

A local circuit is provided for operating each of the transmitters T and T', which local circuits are controlled by the relays R and R' respectively. For instance the armature 17 of the relay R is connected as at 18 to a local battery 19, whereas the front contact 20 of this relay is connected as at 21 with the coil 22 of the transmitter T. The coil in turn is connected with the battery 19 or to a common return or ground 23.

The local circuit of the transmitter T' has the transmitter coil 24 connected by wire 25 to the front contact 26 of the relay R' and to said common return or ground 23 as at 27. The armature 28 of this relay R' is connected to a local battery 29 by wire 30. Thus each of the local circuits includes one of said transmitters and the battery.

From the foregoing description it will be seen that the main line circuit includes the transmitter contact points 5 and 7, whereas the branch line circuit has the contacts 13 and 15 of the other transmitter located therein. Obviously when either of these contact points are spaced apart the respective circuits in which they are located are broken. Therefore a shunting circuit is employed to make a continuous line circuit irrespective of whether or not these contact lines are open or closed. The shunting circuit for the contact points 5 and 7 includes a wire 31 extending from the contact point 5 to a stationary switch contact 32, and a wire 33 connecting the contact point 7 with a movable switch arm 34. Normally this switch arm is engaged with the contact 32, being held in this position by a contractile spring 35. The shunting circuit of the other points 13 and 15 is identical with the first mentioned shunting circuit, corresponding parts of which are designated by the reference characters 31', 32', 33', and 34'. A contractile spring 35' normally holds the switch arm in engagement with the stationary contact 32' thus shunting the transmitter contact points 13 and 15. Inasmuch as it is obviously necessary to have the line circuit which is receiving broken in order to permit the sending line transmitter to repeat thereinto, provision is made for automatically opening either one of the shunting switches including the switch arms 34 and 34' as is necessary. In the present instance this breaking of the receiving line is carried out by a polar relay P, the operation of which is effected by the relays R and R'. Between the poles of the permanent magnet 36 of this polar relay is pivoted a swinging armature 37 which has extensions at its opposite ends, one extension 38 providing a switch engaging member for selective engagement with either of the switch arms 34 or 34'. The other end of the armature carries a pointer or indicator 39 which is designed to be directed to either one of two symbols on a plate 40 carried by the polar relay magnet 36. One of these symbols indicates that the main line is the sending line, while the other indicates that the branch line is the sending line.

In the type polar relay shown herein the armature is provided with a pair of coils located one on each side of its fulcrum. In the present instance one of the coils is connected by wire 41 with a back contact 42 of the relay R and to a contact 43 of the transmitter T'. The armature 6 of this transmitter is designed to engage with this contact 43 and is connected by means of a wire 44 to one contact 45 of a three-blade double throw switch S, a second contact 46 of which is connected by a wire 47 to said common return or ground 23. As indicated in the drawing the central blade of the switch S is adapted to connect the contacts 45 and 46 when swung upwardly into closed position. The other coil on the polar relay armature 37 has a wire 48 connecting it with a back contact 49 of the relay R' and to a contact 50 of the transmitter T. The armature 14 of this transmitter T which is associated with the contact 50 is also connected to this switch contact 45 by a wire 51.

The operation of the parts of the invention thus far described is substantially as follows: Assuming that the main line circuit operator desires to send signals, he opens his key 2 which will cause the armature 17 of the relay R to be drawn back against the back contact 42 thus completing a circuit through one of the coils of the polar relay P if the opposite line is closed, or at its next closing. In other words current will flow from the battery 19 to the armature 17 through the contact 42, the wire 41 to the polar relay armature coil, thence to the contact 43 of the transmitter T', after which it will flow through the armature 6 of this transmitter to the contact 45 by way of the wire 44, and from the switch S to the common return or ground 23, or in other words back to battery. This completion of one of the polar relay circuits causes the armature 37 thereof to oscillate until its projection 38 strikes and rocks the shunting switch arm 34', thereby breaking the shunting circuit of the main line transmitter T, or in other words opening the branch line which is to become the receiving line. In other words with the shunting circuit for the contact points 13 and 15 open, manipulation of the key 2 to send signals will operate the relay R in an obvious manner which in turn will control the local circuit of the transmitter T to cause the latter to register the same signals which are transmitted by the key 2. Furthermore identical signals will be repeated into the receiving line, or in other words the branch line circuit, by the engagement and disengagement of the contact points 13 and 15. On the other hand when the branch line circuit is to be the sending line and the main line circuit the receiving line, the polar relay armature 37 is caused to swing in the opposite direction by the opening of the branch line key 10, thereby breaking the other shunting circuit, and permitting the shunting circuit which was broken to be closed, which is its normal relation. In other words the continuity of the sending line is always maintained and is automatically broken by actuation of the line relays when such sending line is to become the receiving line.

In order that the system may be used as a single line in either direction at the will of the operator at the relay station, the hereinbefore mentioned switch S, which is a singling switch, has been provided. In addition to the contacts 45 and 46 thereof and the central blade which bridges them, this switch includes contacts 52 and 53, and corresponding contacts 52' and 53'. These pairs of contacts are bridged by the outside blades of the switch when the same are thrown downwardly, the contacts 52 and 53 being connected respectively through wires 54 and 55 to the contact points 13 and 15. The other contacts 52' and 53' are similarly connected to the contact points 5 and 7 respectively through wires 56 and 57. This part of the switch S is used for manually and continuously shunting the contact points of the transmitters T and T', or in other words cutting out the polar relay and the shunting switches operated thereby.

It will be noted from the foregoing description that the power used for the local circuits is supplied by battery, but in those offices where dynamo current is used for the local circuits and economy is not essential, the transmitter through whose contact points the sending line circuit is flowing can be closed and thus silenced by connecting the shunting circuits across the front contact and armature of the line relays. Thus the transmitters will always be closed as long as the shunting circuits are complete, the sending transmitter being permitted to operate upon the breaking of its shunting circuit so that signals may be repeated into the receiving line circuit.

Other modifications and changes in addition to that just mentioned may obviously be made in the arrangement of the wiring and the connection of the different instruments without departing from the principles of the invention or sacrificing any of its many advantages.

I claim:

1. In a single line, closed circuit, automatic telegraph repeater adapted for use with a main line and a branch line, each having a local transmitter provided with main and branch line contacts, of a pair of normally closed, shunting switches, which maintain the continuity of the sending line by shunting the main line contact points of one local transmitter, one of the switches being bridged over the main line contacts of each of the local transmitters, and a locally operated polar relay for actuating said switches.

2. In a single line, closed circuit, automatic repeater adapted for use with a main line circuit and a branch line circuit, either of which is selectively adapted to be a sending circuit, or a receiving circuit, a transmitter circuit including a transmitter for each of the line circuits each transmitter being controlled by its respective line circuit and adapted to repeat signals into the other line circuit, a pair of shunting circuits each normally maintaining the continuity of one of the line circuits, and a polar relay for automatically opening one of the shunting circuits to break the continuity of the line circuit which is to receive.

3. In a single line, closed circuit, automatic repeater adapted for use with a main line circuit and a branch line circuit, either of which is selectively adapted to be a sending circuit or a receiving circuit, both of said line line circuits being normally continuous, a transmitter circuit including a transmitter for each of the line circuits, each transmitter being controlled by its respective line circuit and adapted to repeat signals into the other line circuit, a normally closed switch for each of said line circuits, a swinging switch-engaging arm, and means for automatically moving the arm to open the switch of the receiving line circuit when the transmitter of the opposite line in repeating or about to repeat.

4. In a single line, closed circuit, automatic repeater adapted for use with a main line circuit and a branch line circuit, either of which is selectively adapted to be a sending circuit or a receiving circuit, both of said line circuits being normally continuous, a transmitter circuit including a transmitter for each of the line circuits, each transmitter being controlled by its respective line circuit and adapted to repeat signals into the other line circuit, and a polar relay for automatically breaking the normal continuity of the receiving line circuit when the transmitter of the opposite line is repeating or about to repeat.

5. In a telegraph system, in combination, a main line transmitter, a branch line transmitter, a main line circuit including the contact points of the branch line transmitter, a branch line circuit including the contact points of the main line transmitter, a circuit including a normally closed switch for shunting the contact points of each transmitter, the shunting circuit of the branch line transmitter being included as a part of the main line circuit and normally maintaining the continuity thereof, the other shunting circuit being a part of the branch line circuit and normally maintaining its continuity, a relay in each of said line circuits for actuating their respective transmitters, and automatic mechanical means operable by the relay of the sending line circuit for opening the shunting circuit switch of the sending transmitter.

6. In a telegraph system, in combination, a main line transmitter, a branch line transmitter, a main line circuit including the contact points of the branch line transmitter, a branch line circuit including the contact points of the main line transmitter, a relay in each of said line circuits for actuating their respective transmitters, a shunting circuit including a normally closed switch for each of the line circuits for maintaining the continuity thereof, a polar relay adapted to selectively engage and open the last named switches, and a pair of polar relay armature circuits, one including the armature and back contact of the main line relay, and a contact and the armature of the branch line transmitter, the other polar relay armature circuit including the corresponding parts of the branch line relay and main line transmitter, whereby the polar relay armature will be oscillated by the actuation of the line relays.

In testimony that I claim the foregoing I have hereunto set my hand at Milwaukee, in the county of Milwaukee and State of Wisconsin.

RAYMOND C. BLAKESLEE.